(12) United States Patent
Amick et al.

(10) Patent No.: US 7,730,188 B1
(45) Date of Patent: Jun. 1, 2010

(54) VIRTUAL VOICE/COMPANY/OFFICE NETWORK TOOL KIT, METHOD, AND COMPUTER PROGRAM PRODUCT

(76) Inventors: John Kenneth Amick, 980 NW. 49th Way, Coconut Creek, FL (US) 33063; Melodie Kleiman, 355 La Salle Ave., Ventura, CA (US) 93003

( * ) Notice: Subject to any disclaimer, the term of this patent is extended or adjusted under 35 U.S.C. 154(b) by 0 days.

(21) Appl. No.: 09/556,439

(22) Filed: Apr. 24, 2000

Related U.S. Application Data

(60) Provisional application No. 60/130,650, filed on Apr. 23, 1999.

(51) Int. Cl.
G06F 15/16 (2006.01)
G06F 15/173 (2006.01)
H04M 3/00 (2006.01)
H04M 3/42 (2006.01)

(52) U.S. Cl. .................. 709/227; 709/238; 379/211.02; 379/265.02

(58) Field of Classification Search ......... 717/103–123, 717/174–178, 140; 709/201–203, 217, 223–227, 709/228, 249, 238, 240; 455/428; 370/352, 370/392, 389, 400, 486; 379/142, 211, 265, 379/242–244, 201.01, 201.05, 88, 100.12, 379/142.07, 142.15, 265.02, 265.09, 211.02
See application file for complete search history.

(56) References Cited

U.S. PATENT DOCUMENTS

| | | | |
|---|---|---|---|
| 5,459,780 A * | 10/1995 | Sand ...................... 379/265.04 |
| 5,796,633 A * | 8/1998 | Burgess et al. ............... 702/187 |
| 5,808,625 A * | 9/1998 | Picott et al. .................. 345/440 |
| 5,838,903 A * | 11/1998 | Blakely et al. ............... 713/202 |
| 5,867,495 A * | 2/1999 | Elliott et al. ................. 370/352 |
| 5,905,776 A * | 5/1999 | Shaffer ................... 379/142.13 |
| 6,012,074 A * | 1/2000 | Lucas et al. .................. 715/531 |
| 6,026,149 A * | 2/2000 | Fuller et al. .............. 379/88.21 |
| 6,389,124 B1 * | 5/2002 | Schnarel et al. ......... 379/142.01 |
| 6,393,476 B1 * | 5/2002 | Barnhouse et al. .......... 709/223 |
| 6,411,806 B1 * | 6/2002 | Garner et al. ............... 455/428 |
| 6,647,111 B1 * | 11/2003 | Bjornberg et al. ....... 379/220.01 |
| 2003/0016675 A1 * | 1/2003 | Underwood ............. 370/395.1 |

OTHER PUBLICATIONS (No author), "DEC Computer Integrated Telephony (CIT) Applications Interface for VMS Programming", Oct. 1991, Version 2.1 ( hereinafter CIT-DEC); http://www.sysworks.com.au/disk$vaxdocdec952/decw$book/d3euaa14.p5.decw$book.*

Anisimov, N.: "An Approach to Design CTI Applications Using Petri nets: An Example of a Call Center", IEEE Conference on Systems, Man, and Cybernetics, 1998; pp. 238-243; Oct. 1998.*

* cited by examiner

*Primary Examiner*—Paul H Kang

(57) ABSTRACT

A method, system, and computer program product for creating, maintaining and destroying virtual environments. Preprogrammed software objects that perform predetermined functions are created and stored in a repository, the desired objects are selected and configured with user defined parameters to create a customized call processing system. The use of preprogrammed software objects allows the rapid and accurate configuration, manipulation and destruction of virtual environments that networks subscribers together, processes calls, enables messaging, and provides disaster avoidance.

49 Claims, 10 Drawing Sheets

Background Art FIG. 8 sted # VIRTUAL VOICE/COMPANY/OFFICE NETWORK TOOL KIT, METHOD, AND COMPUTER PROGRAM PRODUCT

CROSS REFERENCE TO RELATED APPLICATIONS

The present document claims the benefit of the earlier filing date of co-pending U.S. provisional patent application Ser. No. 60/130,650, entitled "A VIRTUAL VOICE NETWORK TOOL KIT, METHOD AND COMPUTER PROGRAM PRODUCT," filed in the United States Patent and Trademark Office on Apr. 23, 1999, the entire contents of which being incorporated herein by reference.

The present document contains subject matter related to that disclosed in co-pending U.S. utility patent application Ser. No. 09/266,724, entitled "CALL PROCESSING SYSTEM, METHOD AND COMPUTER PROGRAM PRODUCT," filed in the United States Patent and Trademark Office on Mar. 12, 1999, the entire contents of which being incorporated herein by reference.

BACKGROUND OF THE INVENTION

1. Field of the Invention

The present invention pertains to call processing systems and computer-based products used for voice processing, multi-media messaging (e.g., voice mail, e-mail, fax etc.), electronic document sharing, and the storage of electronic records in secure hardened sites (i.e., sites secured against natural or man-made disasters), all of which form part of a "virtual environment" that provides both voice and data disaster avoidance. More particularly, the present invention is directed to development tools (referred to herein as OBJECTS), methods, and documentation used to market, deploy, create, manipulate and destroy virtual environments.

2. Discussion of the Background

Virtual environments are differentiated from other services that allow multi-media messaging and/or electronic document sharing and storage in that they typically employ a form of CALL PULL-BACK technology as discussed in U.S. utility patent application Ser. No. 09/266,724 to accomplish voice call processing in the public switch telephone network (PSTN) and in a packet network. Telephony disaster avoidance is provided at the client's request when performing primary (e.g. answering first), or secondary (e.g., answering a call forwarded or transferred in under a no answer condition), answering, and is coupled with the ability to process calls to locations such as key employees' homes in the event of an emergency. Multi-media messaging and/or document sharing is also used to seamlessly network together a client's staff even when that staff is deployed in multiple remote locations.

Advances in communications (e.g., cellular telephones and the Internet), the increased mobilization of the work force, and the desire of individuals to work securely from "virtual offices" have all fueled the need for integrated communications services. These services often include the voice and data networking of employees and others working outside the traditional office environment. Subscribers may send, receive and manipulate multi-media messaging, share documents, and allow callers to access members of these networks no matter where they are located. The caller need never know that the person they are calling is working from a remote location that may include their home.

It would be advantageous if a customer had the ability to continue functioning after suffering a disaster by hosting applications on equipment located in a hardened site. The routing of callers to the main greeting of the caller's application is handled at the local telephone company central office, (CO) on a busy or no answer condition, or by an edge device located on or near the customer's premise. The caller enters or speaks an extension number or selects from a menu and is transparently connected to an employee of the subscriber. The voiceprint of a known caller can be stored and used for security and access reasons. The caller is given further options if the call encounters a busy or no answer condition. Subscribers may access other subscribers on their network using a telephone or personal computer much like they would in a traditional office. The challenge, then, has been to create the tools, methods and documentation that enable the construction, maintenance and destruction of these networks in a rapid and reliable manner.

SUMMARY OF THE INVENTION

The inventor of the present invention has recognized that currently no effective tools, methods, or computer program products are available to assist in the construction, maintenance, and destruction of virtual environments. Accordingly, one object of the present invention is to provide a solution to this problem, as recognized by the present inventor.

While various system architectures are presented herein, one attribute of the invention is a software tool kit referred to herein as OBJECTS. Depending on the business needs of the client, OBJECTS may work in conjunction with the invention described and disclosed in co-pending U.S. utility patent application Ser. No. 09/266,724. OBJECTS are preprogrammed software constructs that serve as high-level, multi-use, building block-like templates. These templates allow non-technical personnel who understand the business needs of a customer to rapidly and accurately construct, maintain, destroy and document a virtual voice/company/office network.

While more common methods may be used to market these products, another attribute of the invention is that the virtual environments may be packaged and marketed as software applications, and sold in stores or over the Internet. A consumer purchasing the appropriate level of a virtual environment may then order the desired configuration or upgrade needed through a web site authorized to sell the products. A client may even design and/or construct their own virtual environment utilizing tools available through an authorized web site.

The virtual environment products process voice calls and data, allow the user to access multi-media messaging from a phone or a computer, and allow document sharing, which may be accessed through the web site of a client or other designated web site. Disaster avoidance is offered, as is the replacing of a client's trunks or lines with a digital form of transport, which is advantageous since it reduces monthly trunk costs and increases the number of possible simultaneous voice and data sessions. Another advantage gained by the use of digital transport edge devices is that control of number assignments and forwarding is taken from the incumbent local exchange carrier (ILEC) or competitive local exchange carrier (CLEC) and placed in the hands of the application service provider (ASP).

Multi-media messaging may be accessed from a computer, telephone or related device. Utilizing the PSTN or a packet network, voice calls may be processed anywhere in the world without metered charges. Callers may be offered options when a call they initiate encounters a no answer condition.

Virtual environment applications operate on the hardware and software components comprising a virtual environment node or hub.

BRIEF DESCRIPTION OF THE DRAWINGS

A more complete appreciation of the present invention, and many of the attendant advantages thereof, will be readily obtained as the same becomes better understood by reference to the following detailed description when considered in connection with the accompanying drawings, wherein.

DESCRIPTION OF THE PREFERRED EMBODIMENTS

Figure 1:
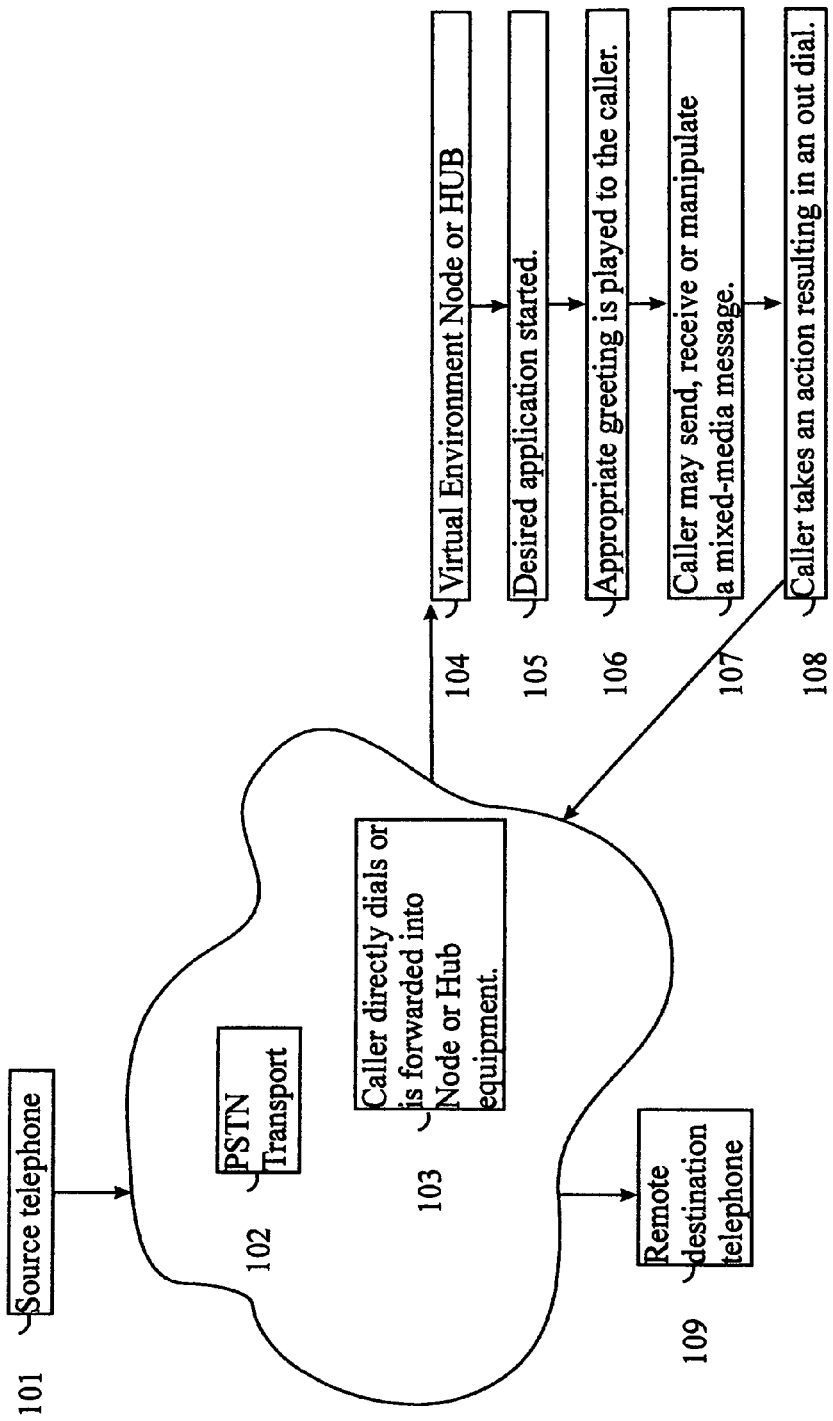
FIG. 1 is a diagram of an exemplary implementation of a company virtual environment operating in the public switch telephone network (PSTN) for one embodiment of the present invention.

Referring now to the drawings, FIG. 1 illustrates one embodiment of the present invention; that of a typical small company virtual environment operating in a PSTN environment. In this embodiment, the system includes a source telephone 101, a PSTN transport 102, a virtual environment node or hub 104 and a remote destination telephone 109. A caller directly dials the telephone number 103 of a virtual environment 104 or is forwarded into the system because all of a customer's lines are busy, no one answers, or someone at the company transfers the caller. The virtual environment node or hub 104 contains the equipment hosting the application that is implemented through the use of OBJECTS. Handling and routing information is sent from the network and a translation on the incoming identification number may be performed in order to accommodate a desired numbering plan 105. The OBJECTS are configured to cause the appropriate greeting to be played to the caller 106. The OBJECTS provide the caller with the options to send, receive or manipulate a mixed media message 107. The caller dials an extension, spells some letters of a name, or otherwise makes a selection which will cause the OBJECTS 108 to dial the appropriate remote telephone number 8. The caller is processed across the network (e.g., PSTN, packet network, leased lines, wireless network) to a remote destination telephone 109 where CALL PULL-BACK may come into play. CALL PULL-BACK feature is disclosed in co-pending U.S. utility application Ser. No. 09/266,724. Users may place a call from an analog, digital, or soft phone (e.g., properly equipped multi-media personal computer) to an analog, digital or soft phone.

Figure 2:
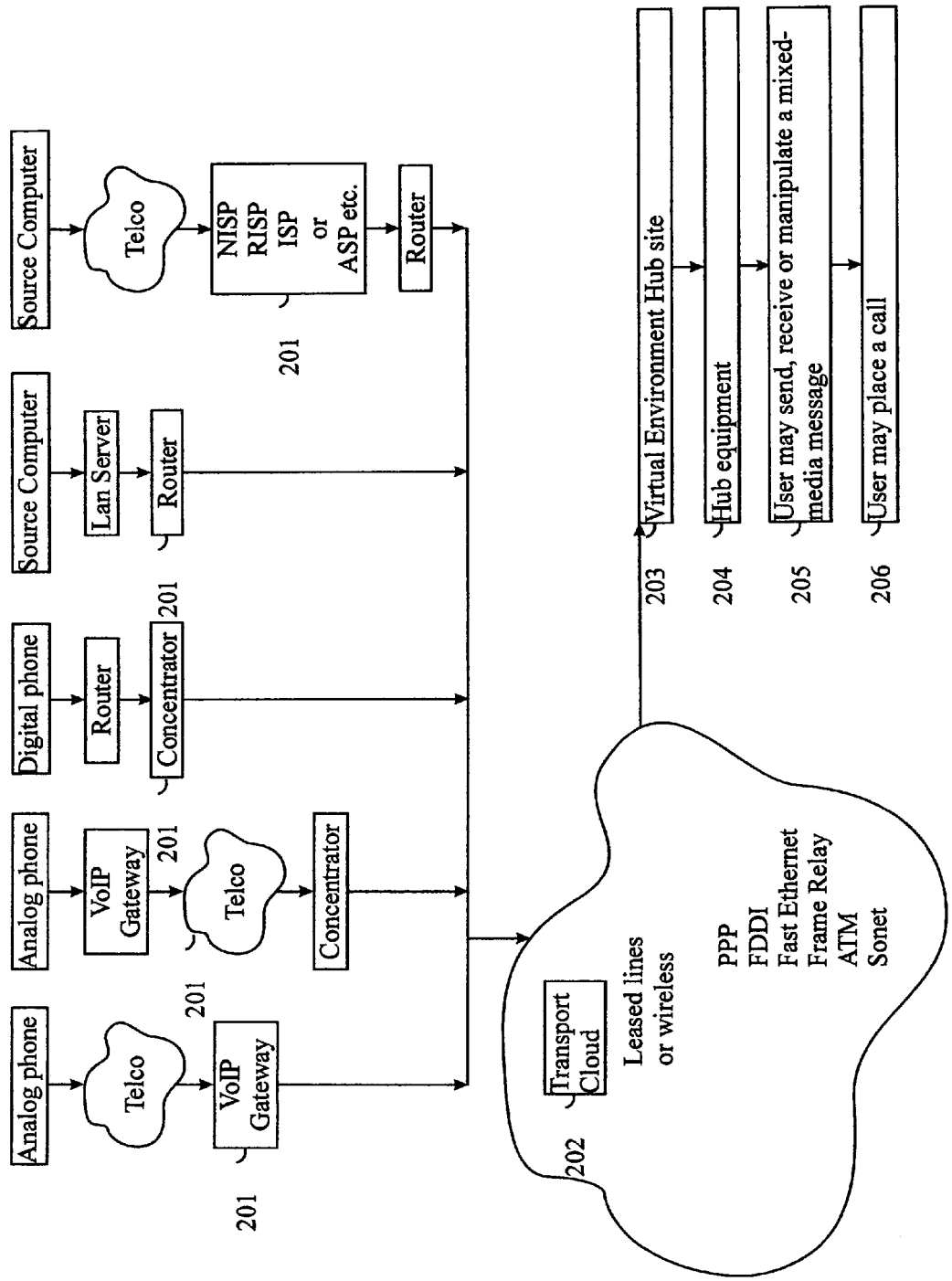
FIG. 2 is a diagram of an exemplary implementation of a company virtual environment operating in a packet network for one embodiment of the present invention.

While FIG. 1 and FIG. 2 are shown separately to simplify the concept of an average company, a virtual environment may employ features shown in both figures as well as employ other services furnished by the virtual environment node or hub. Other services may include, but not be limited to, all the services commonly employed by a national Internet or application service provider.

FIG. 2 illustrates another embodiment of the present invention, that of a typical small company virtual environment operating in a packet network. In this embodiment, the system includes various methods 201 employed to connect with a virtual environment hub site 203 and a transport cloud 202. The virtual environment hub 203 contains the equipment hosting the application that is implemented through the use of OBJECTS. The virtual environment hub 203 may include, for example, ATM, packet and optional voice switches, gateways, concentrators, various subnets and servers 204. The OBJECTS may be configured to allow the users to perform any desired function within the scope of the current technology 205. Users may place a call from an analog, packet or soft phone to an analog, packet or soft phone 206.

Figure 3:
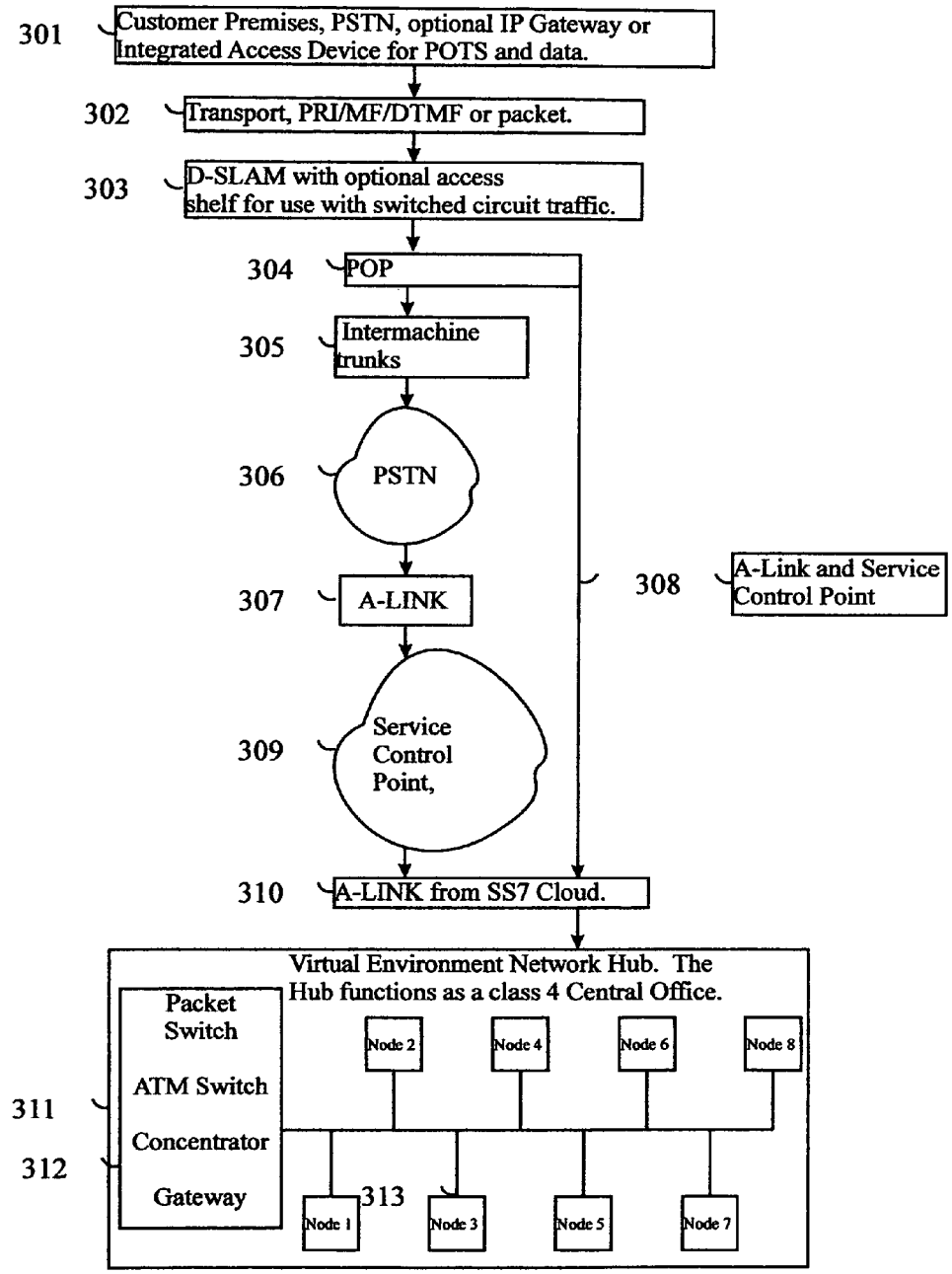
FIG. 3 is a diagram of an implementation of a virtual environment and equipment in the network hub for one embodiment of the present invention.

FIG. 3 provides a more detailed description of one embodiment of the present invention. Shown in FIG. 3 is an implementation of a virtual environment and the equipment in the virtual environment network hub 311. A single hub 311 can handle all virtual environments on a worldwide basis, or multiple hubs 11 may be used to safeguard against cataclysmic disasters. In an embodiment where multiple hubs are used, virtual environments may be mirrored for the sake of redundancy.

An edge device (e.g., a gateway) is placed at the customer premises providing a connection point for transporting voice and or data to and from the customer premises 301. Traffic may be transported between the customer premises and the pop via primary rate interface (PRI), multi-frequency (MF), dual tone multi-frequency (DTMF), or as packets a 302. Located on or near the customer premises, an optional Internet protocol (IP) gateway or integrated access device converts plain old telephone service (POTS) voice traffic to packet traffic and transmits voice and data packets to the point of presence (POP) 304. These gateways and access devices (i.e. edge devices) can replace the majority of the trunks and or lines previously used by the customer. The benefits that may be derived by the customer by replacing the trunks or lines, include, for example, decreases in monthly trunk or line charges, drastic increase in voice and data throughput, improved quality, and giving numbering and forwarding control to the service provider.

The digital subscriber line access multiplier (DSLAM) handles packetized traffic to and from the POP 304, and has an optional access shelf for packetizing switched circuit traffic 303. The POP 304 functions as a class 5 central office (CO) and is the common fiber meet point in the LATA where the local ILEC brings traffic belonging to the CLEC. The POP 304 has one or more connections with backbone carriers and contains the equipment deployed by the service provider. The POP 304 is where the traffic is transferred to an ATM cloud through an ATM access concentrator.

Typically, the majority of callers and employees of a given client are geographically located within the same LATA. For these calls (i.e., those within the same LATA), it is only necessary to allocate the bandwidth in the ATM cloud from the POP 304 to the hub 311 while a selection is made. Upon reaching the hub 311, if a choice is selected which terminates on the same concentrator from which the call originated, the talk path is completed in that concentrator and the virtual point-to-point connection in the ATM cloud is torn down and the bandwidth reallocated.

Intermachine trunks 305 connect the gateway to the PSTN 306. A-links 307, 310 are data links between signaling points and their associated service control point (SCP) in the SS7 cloud 309. Also shown in FIG. 3 is an A-link and SCP where there is no public phone company 308.

The virtual environment network hub 311 functions as a class 4 Central Office. The intelligence is provided by a collection of equipment 312 that functions together through the use of the OBJECTS. This equipment includes, for example, the packet switch, the ATM switch, concentrators and gateways. This intelligence calls on the nodes (e.g., 313) made up of various servers, which host and provide services for subscriber applications as implemented by the OBJECTS.

Figure 4:
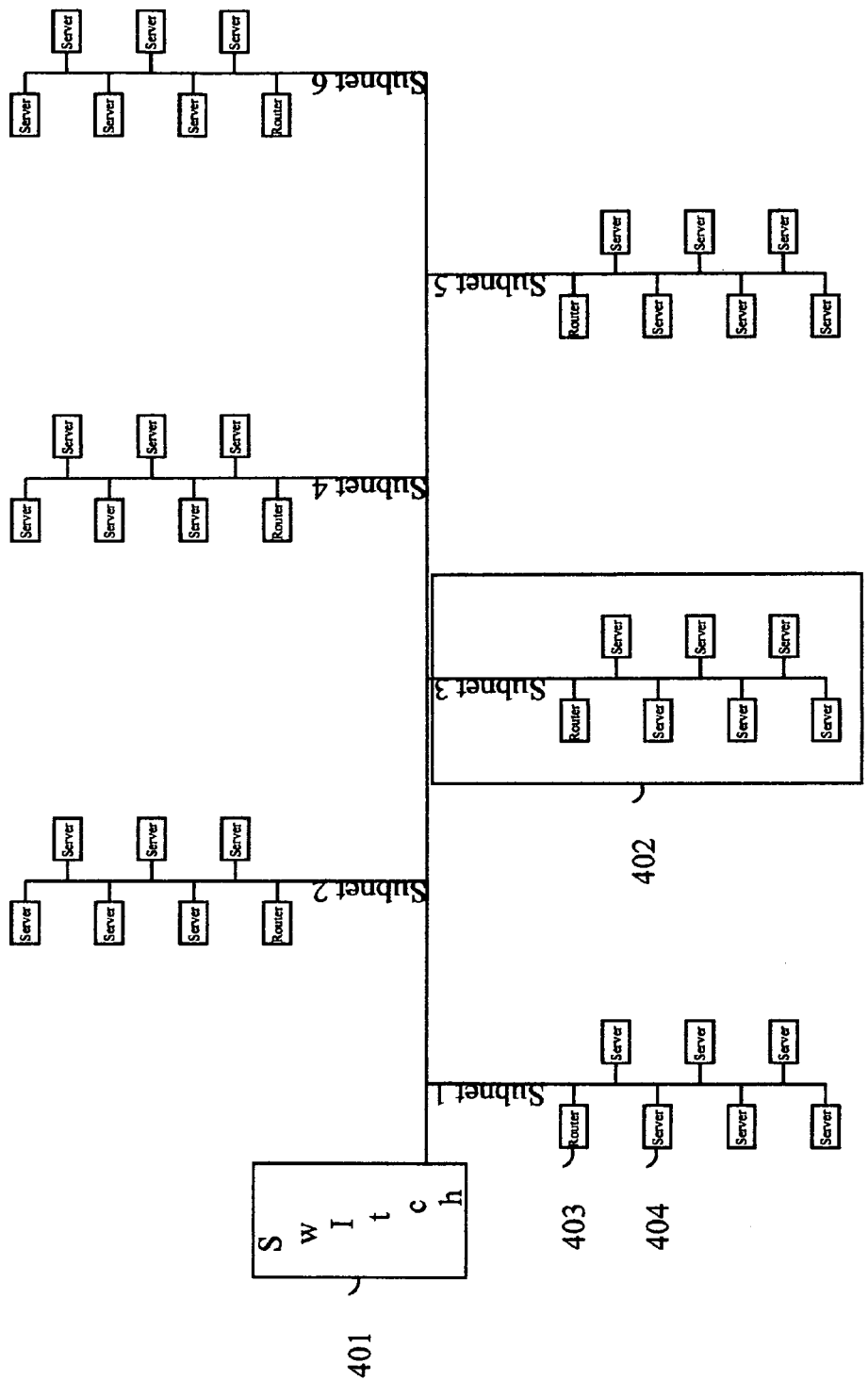
FIG. 4 is a detailed diagram of a node in one embodiment of the present invention.

FIG. 4 is a detailed diagram of a node 313 shown in FIG. 3. Routing may be accomplished at the LEC network level when more than one node is in the hub. Packet switching may be accomplished at the hub. In this manner, routing to the correct node and server is assured. A node may include a voice switch 401. The number of call processing servers (e.g. 4) on a particular switch, generally one per subnet (e.g., 402) is dependent on the number of extension numbers on that switch that can be configured without the need for physical phones and associated equipment. Also shown on the subnets 402 are respective routers (e.g., 403).

Figure 5:
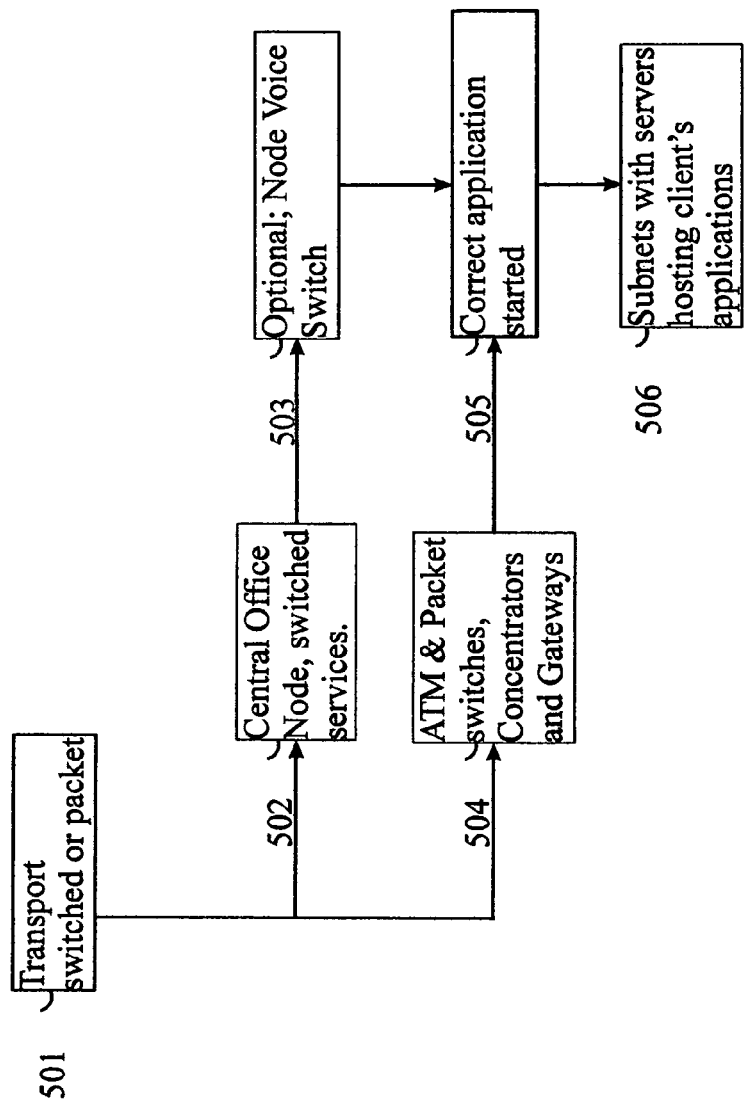
FIG. 5 is a diagram demonstrating how a caller reaches the correct virtual application in one embodiment of the present invention.

FIG. 5 is a diagram demonstrating how a caller reaches the correct virtual environment application implemented through the OBJECTS. The transport 501, is either switched or packet. If the transport is switched, the central office node provides handling and routing information to the various hub nodes for switched services 502. An optional node voice switch 503 is shown, where, after translation, the incoming digits match phantom extension numbers in the numbering plan of the switch. The phantom extensions carrying digital Integration information are forwarded to a hunt pilot number containing the digital extensions used by the correct voice server that may call upon various other servers in the subnet. If the transport is packet, the ATM and packet switches, concentrators and gateways provide handling and routing information to the subnets for packetized voice and applications 504.

The information provided from the appropriate switch starts the correct application under control of the OBJECTS 505. The clients' applications are hosted on one of the many subnets with servers 506.

Figure 6:
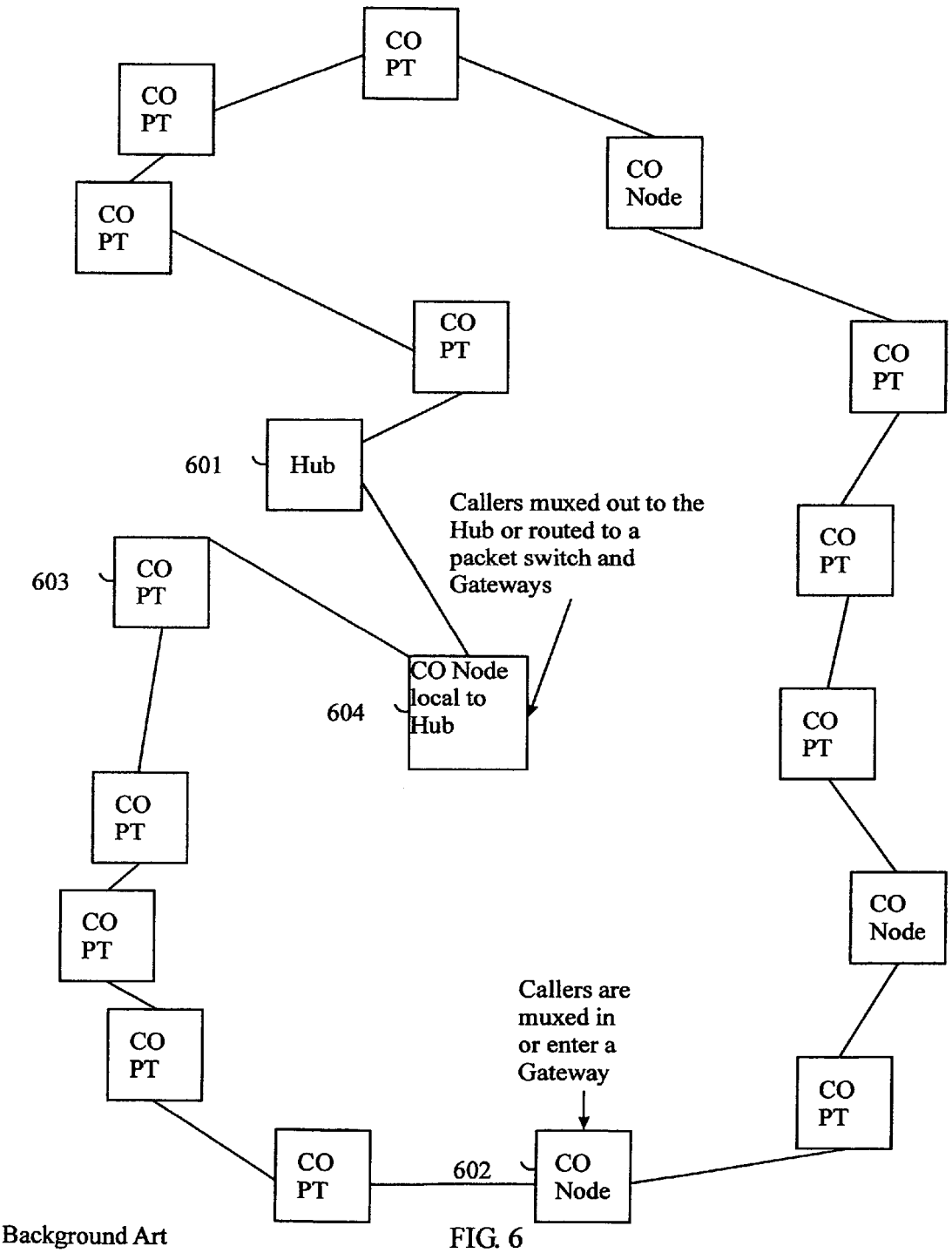
FIG. 6 is a diagram illustrating the use of a Sonet ring to allow callers in a LATA to reach the equipment centralized in one location where the desired application is hosted by dialing the minimum numbers required.

FIG. 6 is a diagram of a method utilizing a Sonet ring deployed in such a way as to allow callers in a LATA to reach the equipment placed in a centralizing location. The hub site 601 hosts the desired application. The CO node 602 is a node into which callers can dial or be forwarded via a local number (i.e., the minimum number of numbers required) without incurring interlata charges. Time division multiplexing (TDM) may be employed so that callers may be muxed (i.e., multiplexed) in by their local CO node or gain access to the ring via a gateway. By configuring the DS1s as point-to-point, the packetized method allows a many-fold increase in throughput; and with ATM over Sonet, data and video ride virtually free in the packets needed to transport voice. Note that these TELCO nodes (CO nodes) are located in various positions within the LATA so that subscribers may access them as a local call and then be "back hauled" across the ring to the centralized hub 601 location. CO pass-throughs 603 connect the various TELCO nodes on the ring as well as the CO node 602 local to the hub location 604. Callers may be muxed out to the hub 601 by the local TELCO CO node 602 or routed to a packet switch and gateway servers.

Figure 7:
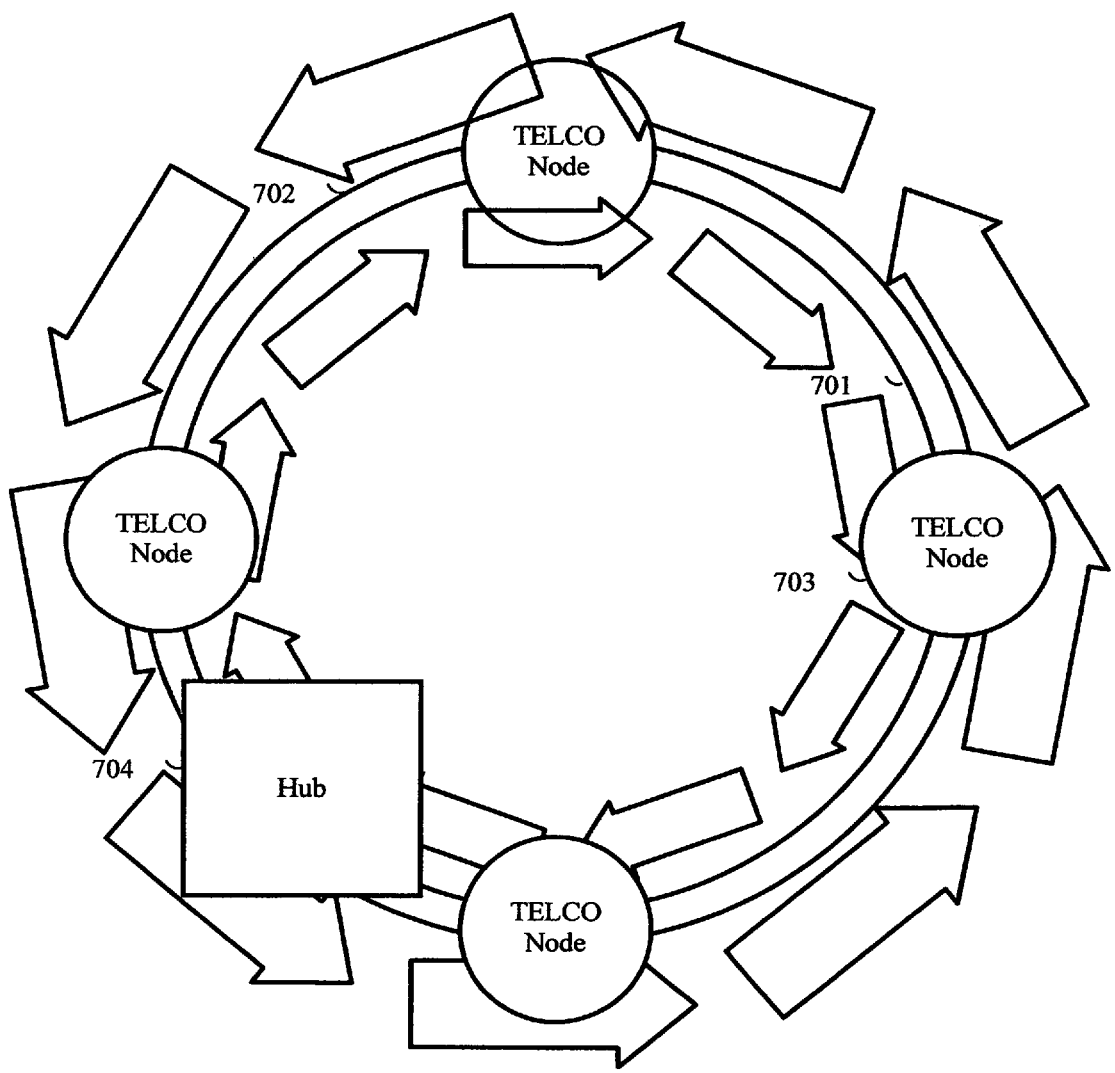
FIG. 7 is a diagram showing central office nodes and a hub site placed on a counter rotating, self-healing Sonet ring that has a guaranteed downtime of less than one second per failure.

FIG. 7 is a diagram showing the CO nodes and hub site described above, placed on a counter-rotating, self-healing Sonet ring for transporting both voice and data in the LATA. The inner ring 701 has traffic flowing in a clockwise direction. The outer ring 702 has traffic flowing in a counterclockwise direction. The ring may provide a guaranteed downtime of less than one second per failure. The TELCO node 703 can be reached by the users as a local call, from which they will be "back hauled" to the hub. The hardened centralized equipment location called the hub 704, contains the equipment for electronic document storage. To avoid a single point of failure, the ring enters the hub site 704 in two places located on different faces of the hub facility.

Figure 8:
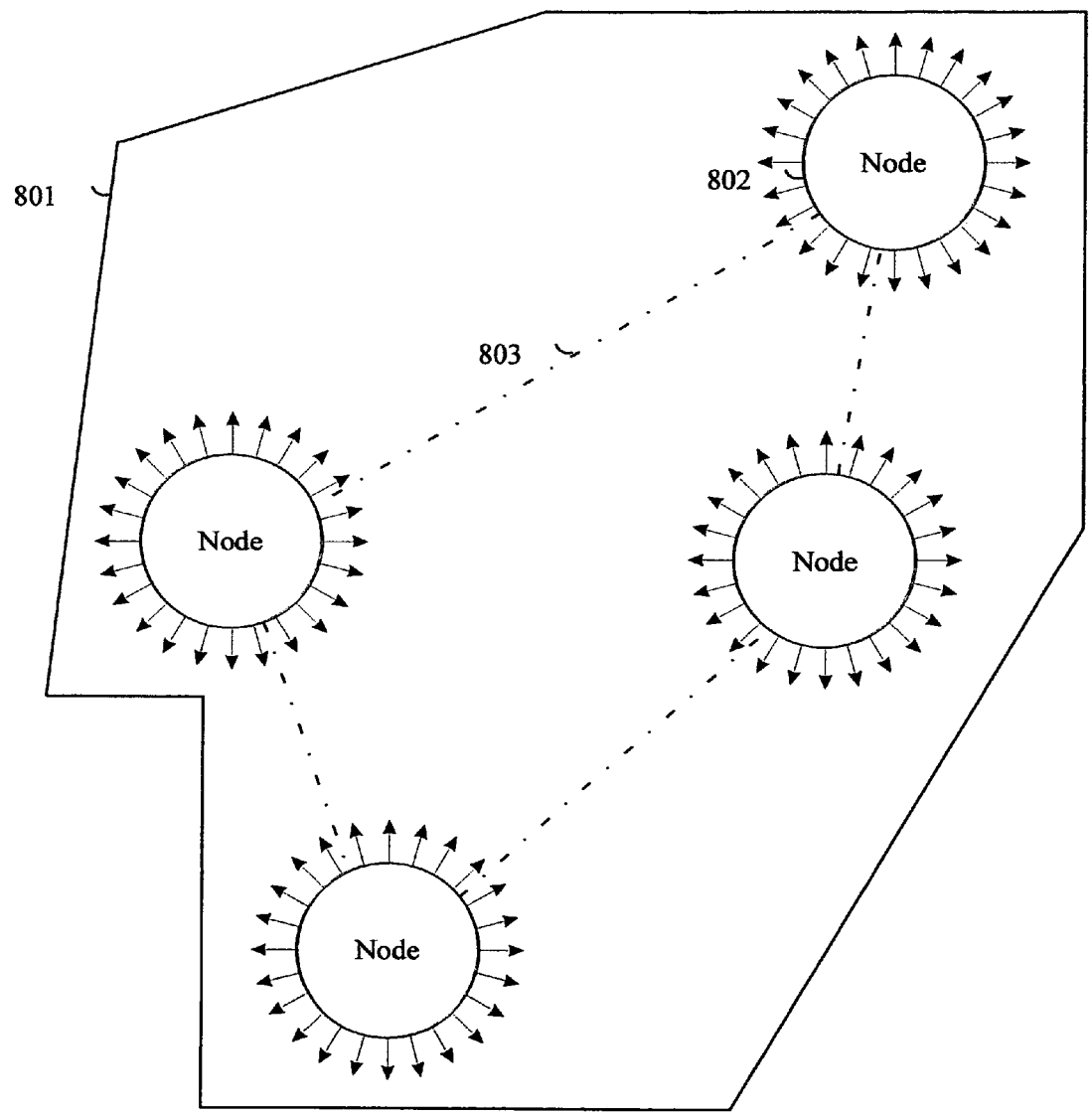
FIG. 8 is a diagram demonstrating the deployment of equipment in multiple locations and using the carrier's outbound footprint to provide service in a LATA.

FIG. 8 is a diagram demonstrating a multi-location four node LATA method of providing service in a LATA 801. Nodes 802 are deployed at various locations within the LATA allowing all callers to access at least one of the nodes 2 in their area by dialing a local number. The number of nodes 802 providing coverage in a LATA will vary with the demographics of the area. At this time in the competition for interlata business, carriers are offering large toll-free outbound footprints. Inbound calls to the average virtual environment customer are primarily all local calls. Arrows from the nodes 802 depict the outbound footprint. In most cases, the outbound footprint is large enough to cover the majority, if not all, of the LATA 801 from any node 2 within a given LATA 1. These large outbound footprints allow the nodes 2 to process traffic without incurring interlata charges. Other means of transport that can be used to carry traffic between nodes 2 for callers who need to exceed the outbound footprint include, for example, PSTN, leased lines, wireless, fast Ethernet, frame relay, ATM, and Sonet.

Figure 9:
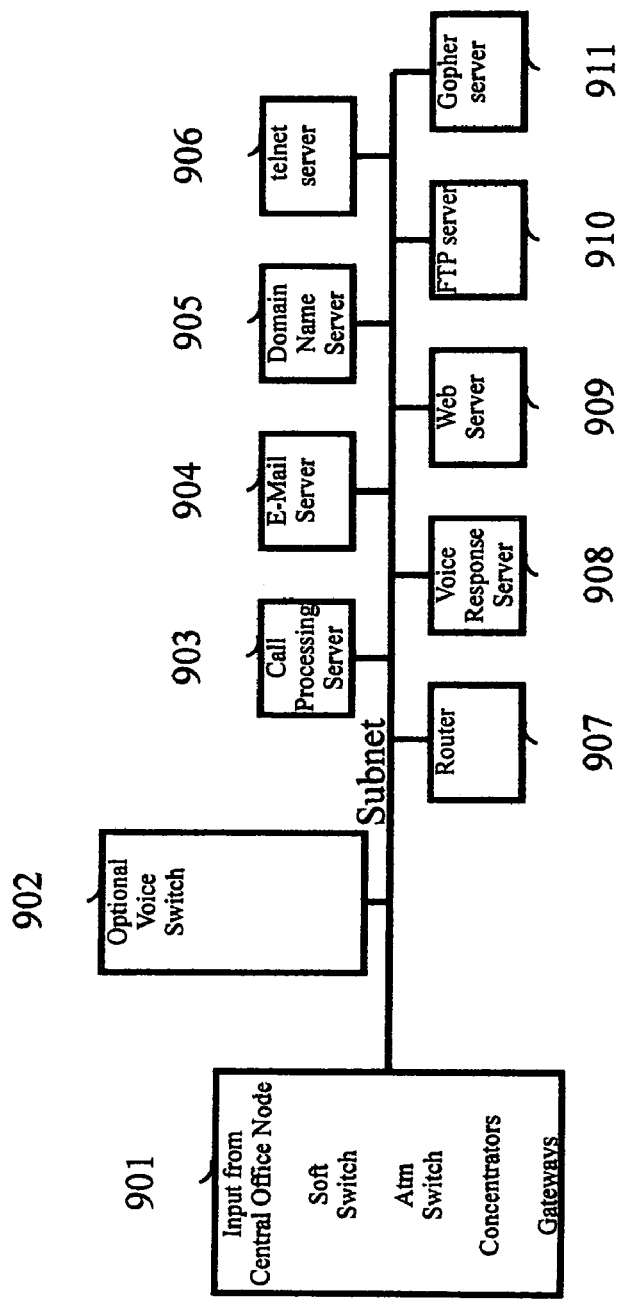
FIG. 9 is a diagram clarifying the function of OBJECTS in the Objects Tool Kit in one embodiment of the present invention.

FIG. 9 is a diagram clarifying the functioning of OBJECTS in the Object Tool Kit. An incoming call comes from the central office node or ATM switch 901. An optional voice switch 902 performs the numbering plan translations and is digitally integrated with the call processing server 903, commonly referred to as the voice server, where callers come under control of OBJECTS which may in turn call upon services from the other servers and the router 904-911. The voice response server 908 is digitally integrated with the packet switch.

An OBJECT is a proven preprogrammed software construct which by itself, or when assembled with other OBJECTS, provides a desired functionality. OBJECTS are written in traditional programming languages, scripting languages, and high-level command line code. OBJECTS allow non-technical personnel who understand the business needs of a customer to rapidly and accurately create, manipulate and destroy these virtual environments.

OBJECTS operate in conjunction with, for example, parameters, tables, attributes, classes, routines, methods and compiled code which control the various components in the hub and nodes. OBJECTS perform the various functions so that the needs of the client are met. The creator of a virtual environment places clients' mailboxes in classes of service that have been pre-configured as OBJECTS. When services from other servers are needed, OBJECTS furnish those services in the appropriate manner. If switching services are required, OBJECTS will issue commands to the switch for functions such as routing a call. As with any product in the computer/telephony world, the OBJECTS Tool Kit is constantly evolving.

A living document has been created describing the functionality and services provided by each OBJECT. Personnel responsible for the creation of virtual environments use this documentation to configure the OBJECTS. OBJECTS that are used to create a particular virtual environment have the explanation of the functionality and services of the OBJECT in the documentation under the heading of each class of service (COS) or OBJECT (OBJ). The OBJECT itself is not a class of service; it is all of the preprogrammed and tested software comprising that construct. Having these preprogrammed and tested OBJECTS available allows the offering of inexpensive, reliable, custom virtual environments in a very rapid and cost effective manner.

Cost effectiveness is an important reason that others are not building sophisticated custom configurations for large numbers of small clients. Without the use of an Object Tool Kit, their personnel would have to program each configuration from scratch. The best way to define a given OBJECT is to define its functions. One of the unique features of the OBJECTS of the present invention is that a single instance of a given OBJECT can operate at the same time on one or more physical platforms with different operating systems. Each OBJECT is made up of many components. A representative list of OBJECTS and their associated functionality is provided below.

OBJECT/Class of Service documentation:

| OBJECT/CLASS OF SERVICE | FUNCTION OF OBJECT/CLASS OF SERVICE |
|---|---|
| OBJ/COS 0 | Unassigned D.I.D. mailboxes. NOTE: A silent D.I.D. mailbox greeting must berecorded.<br>Non-area code specific Object.<br>Description:<br>The number of a mailbox placed in this Object matches the number that will be received by the Call Processor Portion of the Node or Hub after any and all translations are accomplished. This number is generated when a caller reaches a telephone number issued to a customer. As numbers in Object 0 are not currently issued but are defined and can still be reached from the outside world, they are kept in Object 0. When one of these numbers is dialed, the following recording is played: "You have reached an unassigned telephone number, please hang up and try again" . No input is accepted from the caller. No message is taken which prevents unwanted messages such as those left by automatic dialers from consuming storage. The caller hears, "Goodbye" and is dropped. |
| OBJ/COS 1 | Company greetings, no associated extension or telephone number, no messages may be recorded. Play greeting twice and disconnect.<br>Non area code specific Objects.<br>Description:<br>The caller hears a recorded message and may enter an extension number or select a menu choice. No numbers are dialed automatically upon a caller reaching this mailbox. If the caller takes no action, the greeting is played twice and the caller is dropped. |
| OBJ/COS 2 | Disconnect from caller. Play silent greeting and hang up. No input is accepted from the caller.<br>Non area code specific Object.<br>Description:<br>Commonly used as part of a configuration where there is a need to play a recording. While the recording is being played, allow the user to take an action such as entering an extension number or making a choice. If no selection or choice is made after the recording is played, there is a moment of silence while the caller is moved to a mailbox and placed in Object 2 where they may or may not hear a second recording depending upon the application desired. No input is accepted from the caller. After the moment of silence or the second recording is played, the caller is dropped. |
| OBJ/COS 3 | Company greetings; no associated extension or telephone number; no messages may be recorded. Play greeting and disconnect.<br>Non area code specific Object<br>Description:<br>The caller hears a recorded message and may enter an extension number or select a menu choice. If the caller takes no action, the caller is dropped. |
| OBJ/COS 4 | Object dedicated to one-of-a-kind, customer specific application.<br>Description:<br>If caller presses a zero, a ring-all hunt group is activated. |
| OBJ/COS 5 | Voice Response Server prompt mailboxes<br>Store recordings used by the Voice Response Server<br>Description:<br>Store recordings used by the Voice Response portion of the Node or Hub. |
| OBJ/COS 6 | Pilot mailbox for Voice Response Server message pool<br>Store recordings used by the Voice Response Server application processor.<br>Description:<br>The lead mailbox number of a list of mailboxes responsible for the storage of application controlled messages. |

-continued

OBJECT/Class of Service documentation:

| OBJECT/<br>CLASS OF<br>SERVICE | FUNCTION OF OBJECT/CLASS OF SERVICE |
|---|---|
| OBJ/COS 7 | Fax only with voice annotation.<br>Non area code specific Object.<br>Description:<br>Any mailbox placed in this Object will accept only a fax with or without voice annotation. User key press input is accepted. |
| OBJ/COS 8 | Voice Response Server Error mailbox.<br>Store error recording used by the Voice Response Server application processor.<br>Description:<br>Any mailbox placed in this Object is an error-handling mailbox for the Voice Response Server portion of the Node or Hub. User input is accepted. |
| OBJ/COS 9 | Fax on demand. Prints the first fax in each mailbox.<br>Non area code specific Object.<br>Description:<br>Prints only the first fax stored in a mailbox placed in this Object. |
| OBJ/COS 10 | Application Processor control.<br>Non area code specific Object.<br>Description:<br>Takes the caller to Application Processor Control. A caller that reaches a mailbox in this Object is provided services by the Voice Response Server application associated with that mailbox which acts as a call identification number. |
| OBJ/COS 11 | Plays greeting once; after greeting plays, use extension number for next mailbox.<br>Non area code specific Object.<br>Description:<br>Normally used to play a recording once which may give the caller enough time to take an action such as dialing an extension or selecting a choice. After greeting plays or if the caller takes no action, the caller is moved to a different part of the application. Also used as a way to rapidly and automatically move a caller from one mailbox to another. |
| OBJ/COS 12 | Play greeting twice; after greeting plays, use extension number for next mailbox.<br>Non area code specific Object.<br>Description:<br>Normally used to play a recording twice, which may give the caller enough time to take an action such as dialing an extension or selecting a choice. After greeting plays or if the caller takes no action, the caller is moved to a different part of the application. Also used as a way to rapidly and automatically move a caller from one mailbox to another. |
| OBJ/COS 13 | Block access to system distribution pilot numbers.<br>Non area code specific Object.<br>Description:<br>Access to a distribution list whose pilot number is placed in this Object is restricted to users with special mailbox programming. |
| OBJ/COS 14 | Fax overflow mailboxes (M/Bs).<br>Non area code specific Object.<br>Description:<br>Used to provide a "fax store and forward" service to a customer. When a fax machine on the customer's premise is busy or no answer, the caller is forwarded to a mailbox in this Object that provides fax tone, takes a fax, and repeatedly attempts to deliver that fax back to the originally called fax machine until successful. |
| OBJ/COS 15 | Call number first before playing greeting; record message option; offsite only if urgent. May receive fax.<br>Object dedicated to one-of-a-kind, customer specific application.<br>Description:<br>Ring an extension; if busy or no answer, play a greeting, take a message, and activate "off site message waiting" if the caller marked the message urgent. In addition, a mailbox placed in this Object will accept a fax. While listening to the greeting the caller may enter an extension number or select a choice. |
| OBJ/COS 16 | Call number first before playing greeting; record message option; station has multiple mailboxes; ask before connecting; offsite only if urgent; may receive fax.<br>Object dedicated to one-of-a-kind, customer specific application.<br>Description:<br>Ring a phone; if answered, announce the call; if busy or no answer, play a greeting, take a message, and activate "off site message waiting" if the caller marked the message urgent. In addition, a mailbox placed in this Object will accept a fax. While listening to the greeting the caller may enter an extension number or select a choice. |
| OBJ/COS 17 | "Greeting on" stops numbers from being dialed; record message option; offsite only if urgent; may receive fax.<br>Object dedicated to one-of-a-kind, customer specific application.<br>Description:<br>Recording a greeting and turning the greeting on stops the extension number associated with a mailbox in this Object (if one exists) from being dialed. Mailbox will take a message and activate "off site message waiting" if the caller |

-continued

OBJECT/Class of Service documentation:

| OBJECT/<br>CLASS OF<br>SERVICE | FUNCTION OF OBJECT/CLASS OF SERVICE |
|---|---|
| | marked the message urgent. In addition, a mailbox placed in this Object will accept a fax. While listening to the greeting the caller may enter an extension number or select a choice. |
| OBJ/COS 18 | Professional voice.<br>Object dedicated to one-of-a-kind, customer specific application.<br>Description:<br>Along with the normal features and functions given most users, a Mailbox placed in this Object has the privilege of being able to name mailboxes. Recording a greeting and turning the greeting on stops the extension number associated with a mailbox in this Object (if one exists) from being dialed. While listening to the greeting the calle may enter an extension number or select a choice. |
| OBJ/COS 19 | Forms.<br>Object dedicated to one-of-a-kind, customer specific application.<br>Description:<br>This Object provides specific customers with an application that asks a series of questions one at a time and records the answers the caller gives in the caller's own voice. After the questions are asked, the caller is given the option of reviewing their answers and re-recording them if so desired. Upon acceptance of the answers by the caller, the answers to the questions are placed in a mailbox which has been specified by the customer for further action. |
| OBJ/COS 21 | Page every time a message is left.<br>Object dedicated to one-of-a-kind, customer specific application.<br>Description:<br>When placed in this Object, a mailbox with an internal extension will activate a pager every time a message is left during user specified time periods. Recording a greeting and turning the greeting on stops the extension number associated with a mailbox in this Object (if one exists) from being dialed. While listening to the greeting the caller may enter an extension number or select a choice. |
| OBJ/COS 30 | Local call; call number first before playing greeting; record message option.<br>Non area code specific Objects.<br>Description:<br>A mailbox placed in this Object will call an external telephone number without dialing an area code and if not answered, will play a greeting and record a message. While listening to the greeting the caller may enter an extension number or select a choice. |
| OBJ/COS 31 | Local call; call number first before playing greeting; record message option.<br>Station has multiple mailboxes; ask before connecting.<br>Non area code specific Objects.<br>Description:<br>Dial a telephone number without dialing an area code; if answered, announce the call; if busy or no answer, play a greeting and take a message. While listening to the greeting the caller may enter an extension number or select a choice. |
| OBJ/COS 32 | Local call; "greeting on" stops numbers from being dialed; record message option.<br>Non area code specific Objects.<br>Description:<br>Recording a greeting and turning the greeting on stops the telephone number associated with a mailbox in this Object (if one exists) from being dialed. When the user turns off the greeting, a mailbox placed in this Object will ring a phone without dialing an area code. The mailbox will take a message. While listening to the greeting the caller may enter an extension number or select a choice. |
| OBJ/COS 33 | Local call; call number first before playing greeting; record message option;<br>Offsite only if urgent; may receive Fax.<br>Non area code specific Objects.<br>Description:<br>Ring a phone without dialing an area code; if busy or no answer, play a greeting and take a message. Mailbox will take a message and activate "off site message waiting" if the caller marked the message urgent. In addition, a mailbox placed in this Object will accept a fax. While listening to the greeting the caller may enter an extension number or select a choice. |
| OBJ/COS 34 | Local call, call number first before playing greeting; record message option.<br>Station has multiple mailboxes; ask before connecting. Offsite only if urgent.<br>May receive Fax.<br>Non area code specific Objects.<br>Description:<br>Ring a phone without dialing an area code. If answered, the call will be announced and the called party will be given the option to accept or reject the call. If busy or no answer, a greeting may be played and a message taken. Mailbox will take a message and activate "off site message waiting" if the caller marked the message urgent. In addition, a mailbox placed in this Object will accept a fax. While listening to the greeting the caller may enter an extension number or select a choice. |
| OBJ/COS 35 | Local call; "greeting on" stops numbers from being dialed; record message option; offsite only if urgent; may receive Fax. |

OBJECT/Class of Service documentation:

| OBJECT/<br>CLASS OF<br>SERVICE | FUNCTION OF OBJECT/CLASS OF SERVICE |
|---|---|
| | Non area code specific Objects.<br>Description:<br>Recording a greeting and turning the greeting on stops the telephone number associated with a mailbox in this Object (if one exists) from being dialed. When the user turns off the greeting, a mailbox placed in this Object will ring a phone without dialing an area code. Mailbox will take a message and activate "off site message waiting" if the caller marked the message urgent. In addition, a mailbox placed in this Object will accept a fax. While listening to the greeting the caller may enter an extension number or select a choice. |
| OBJ/COS 36 | Local call; blind transfer.<br>Non area code specific Objects.<br>Description:<br>A mailbox in this Object will dial a telephone number without dialing an area code and then perform a blind transfer. The caller may dial no numbers and no messages may be recorded. |
| OBJ/COS 37 | Local call; call number first before playing greeting; no messages; play greeting twice; allow user to dial.<br>Non area code specific Objects.<br>Description:<br>A mailbox in this Object will dial a telephone number without dialing an area code; if busy or no answer, the greeting will play twice, the user will be allowed to dial an extension or select a choice. No messages may be recorded. |

The following is an example of a set of area code specific OBJECTS. For clarity, only one set of area code specific OBJECTS are shown.

Example set of Area Code Specific OBJECTS:

| | |
|---|---|
| OBJ/COS 50 | (305) area code call; call number first before playing greeting; record message option.<br>Area code specific Objects.<br>Description:<br>A mailbox placed in this Object will dial a "1" and the above area code before calling an external telephone number. If the call is not answered; the mailbox will play a greeting and record a message. While listening to the greeting the caller may enter an extension number or select a choice. |
| OBJ/COS 51 | (305) area code call; call number first before playing greeting; record message Option. Station has multiple mailboxes; ask before connecting.<br>Area code specific Objects.<br>Description:<br>A mailbox placed in this Object will dial a "1" and the above area code before calling an external telephone number. If answered, it will announce the call; if busy or no answer, it will play a greeting and take a message. While listening to the greeting the caller may enter an extension number or select a choice. |
| OBJ/COS 52 | (305) area code call; "greeting on" stops numbers from being dialed; record Message option.<br>Area code specific Objects.<br>Description:<br>Recording a greeting and turning the greeting on stops the telephone number associated with a mailbox in this Object (if one exists) from being dialed. When the greeting is turned off by the user, a mailbox placed in this Object will dial a "1" and the above area code before calling an external telephone number. The mailbox will take a message. While listening to the greeting the caller may enter an extension number or select a choice. |
| OBJ/COS 53 | (305) area code call; call number first before playing greeting; record message Option; offsite only if urgent; may receive Fax.<br>Area code specific Objects.<br>Description:<br>A mailbox placed in this Object will dial a "1" and the above area code before calling an external telephone number. If busy or no answer, play a greeting and take a message. Mailbox will take a message and activate "off site message waiting notification" if the message was marked urgent. In addition, a mailbox placed in this Object will accept a fax. While listening to the greeting the caller may enter an extension number or select a choice. |
| OBJ/COS 54 | (305) area code call; call number first before playing greeting; record message option. Station has multiple mailboxes; ask before connecting. Offsite only if |

| | Example set of Area Code Specific OBJECTS: |
|---|---|
| | urgent. May receive Fax.<br>Area code specific Objects.<br>Description:<br>A mailbox placed in this Object will dial a "1" and the above area code before calling an exernal telephone number. If answered, the call will be announced and the called party will be given the option to accept or reject the call. If busy or no answer, a greeting may be played and a message taken. Mailbox will take a message and activate "off site message waiting if the message was marked urgent. In addition, a mailbox placed in this Object will accept a fax. While listening to the greeting the caller may enter an extension number or select a choice. |
| OBJ/COS 55 | (305) area code call; "greeting on" stops numbers from being dialed; record message option; Offsite only if urgent; may receive Fax.<br>Area code specific Objects.<br>Description:<br>Recording a greeting and turning the greeting on stops the telephone number associated with a mailbox in this Object (if one exists) from being dialed. When the greeting is turned off by the user, a mailbox placed in this Object will dial a "1" and the above area code before calling an external telephone number. Mailbox will take a message and activate "off site message waiting" if the caller marked the message urgent. In addition, a mailbox placed in this Object will accept a fax. While listening to the greeting the caller may enter an extension number or select a choice. |
| OBJ/COS 56 | (305) area code call; blind transfer.<br>Area code specific Objects.<br>Description:<br>A mailbox placed in this Object will dial a "1" and the above area code before calling an external telephone number and performing a blind transfer. The caller may dial no numbers and no messages may be recorded. |
| OBJ/COS 57 | (305) area code call; call number first before playing greeting; no messages; play greeting twice; allow user to dial.<br>Area code specific Objects.<br>Description:<br>A mailbox placed in this Object will dial a "1" and the above area code before calling an external telephone number. If the number is busy or no answer, a greeting will play twice and the user will be allowed to dial an extension or select a choice; no messages may be recorded. |
| OBJ/COS 455 | Object dedicated to one-of-a-kind, customer specific application.<br>Description:<br>Ring a phone without dialing an area code. If answered, the call will be announced and the called party will be given the option to accept or reject the call. If busy or no answer, a greeting may be played and a message taken. Mailbox will take a message and activate "off site message waiting" if the caller marked the message urgent. In addition, a mailbox placed in this Object will accept a fax. While listening to the greeting the caller may enter an extension number or select a choice.<br>This Object provides a special dynamic call blocking service to the company. When a caller enters a universal port they are given a numeric value that stays with them for the duration of the call. The caller may only reach an Object with the same numeric value or a "0" value. |
| OBJ/COS 456 | Object dedicated to one-of-a-kind, customer specific application.<br>Description:<br>Takes the caller to Application Processor Control. A caller that reaches a mailbox in this Object is taken to the IVR application associated with that mailbox which acts as a call identification number.<br>This Object provides a special dynamic call blocking service to the company. When a caller enters a universal port they are given a numeric value that stays with them for the duration of the call. The caller may only reach an Object with the same numeric value or a "0" value. |
| OBJ/COS 457 | (800) area code.<br>Object dedicated to one-of-a-kind, customer specific application.<br>Description:<br>A mailbox placed in this Object will dial a "1" and the above area code before calling an external telephone number. If answered, it will announce the call; if busy or no answer, it will play a greeting and take a message. While listening to the greeting the caller may enter an extension number or select a choice.<br>This Object provides a special dynamic call blocking service to the company. When a caller enters a universal port they are given a numeric value that stays with them for the duration of the call. The caller may only reach an Object with the same numeric value or a "0" value. |
| OBJ/COS 458 | Object dedicated to one-of-a-kind, customer specific application.<br>Description:<br>Recording a greeting and turning the greeting on stops the telephone number associated with a mailbox in this Object (if one exists) from being dialed. When the user turns off the greeting, a mailbox placed in this Object will ring a phone without dialing an area code. Mailbox will take a message. While listening to the greeting the caller may enter an extension number or select a choice.<br>This Object provides a special dynamic call blocking service to the company. |

-continued

| Example set of Area Code Specific OBJECTS: | |
|---|---|
| | When a caller enters a universal port they are given a numeric value that stays with them for the duration of the call. The caller may only reach an Object with the same numeric value or a "0" value. |
| OBJ/COS 459 | Object dedicated to one-of-a-kind, customer specific application. Used to automatically move callers to different parts of an application. Description: This Object provides a special dynamic call blocking service to the company. When a caller enters a universal port they are given a numeric value that stays with them for the duration of the call. The caller may only reach an Object with the same numeric value or a "0" value. |
| OBJ/COS 460 | Object dedicated to one-of-a-kind, customer specific application. Description: Plays an announcement twice and hangs up. This Object provides a special dynamic call blocking service to the company. When a caller enters a universal port they are given a numeric value that stays with them for the duration of the call. The caller may only reach an Object with the same numeric value or a "0" value. |
| OBJ/COS 462 | Object dedicated to one-of-a-kind, customer specific application. Description: Ring a phone without dialing an area code; if answered, announce the call; if busy or no answer, play a greeting and take the caller to a specific location in the customer's configuration. While listening to the greeting the caller may enter an extension number or select a choice. |
| OBJ/COS 463 | Object dedicated to one-of-a-kind, customer specific application. Description: Ring a phone without dialing an area code; if answered, announce the call; if busy or no answer, play a greeting and take the caller to a specific location in the customer's configuration. While listening to the greeting the caller may enter an extension number or select a choice. |
| OBJ/COS 464 | Object dedicated to one-of-a-kind, customer specific application. Description: This Object provides a specific customer with an application that asks a series of questions one at a time and records the answers that a caller gives in their own voice. After the questions are asked, the caller is given the option of reviewing their answers and re-recording them if so desired. Upon acceptance of the answers by the caller, the answers to the questions are placed in a mailbox specified by the customer for further action. |
| OBJ/COS 465 | Object dedicated to one-of-a-kind, customer specific application. Description: This Object provides a specific customer with an application that asks a series of questions one at a time and records the answers that a caller gives in their own voice. After the questions are asked, the caller is given the option of reviewing their answers and re-recording them if so desired. Upon acceptance of the answers by the caller, the answers to the questions are placed in a mailbox specified by the customer for further action. |
| OBJ/COS 468 | Object dedicated, to one-of-a-kind, customer specific application. Description: This Object provides time of day control so callers hear different appropriate recordings at different times of day. |
| OBJ/COS 469 | Object dedicated to one-of-a-kind, customer specific application. Description: This Object provides time of day control so callers who press a "0" for the operator will be moved to different mailboxes during different times of day and after hours. One mailbox will ring a phone without dialing an area code; if answered, announce the call; if busy or no answer, play a greeting and take a message. The other mailbox takes a message without dialing a phone (normally used after hours or during lunch). While listening to the greeting the caller may enter an extension number or select a choice. |
| OBJ/COS 472 | Object dedicated to one-of-a-kind, customer specific application. Description: A mailbox placed in this Object has an intercept that can be controlled by time of day. |
| OBJ/COS 473 | (718) area code; blind transfer. Area code specific Objects. Description: A mailbox placed in this Object will dial a "1" and the above area code before calling an external telephone number and performing a blind transfer. The caller may dial no numbers and no messages may be recorded. |
| OBJ/COS 474 | Object dedicated to one-of-a-kind, customer specific application. Description: This Object provides time of day control so callers hear different appropriate recordings at different times of day. |
| OBJ/COS 475 | Object dedicated to one-of-a-kind, customer specific application. Description: The caller hears a recorded message and may enter an extension number or select a menu choice. No telephone numbers are dialed automatically upon a caller reaching this mailbox. If the caller takes no action, the greeting is played twice |

-continued

Example set of Area Code Specific OBJECTS:

| | |
|---|---|
| | and the caller is dropped. A mailbox placed in this Object has a specific dedicated operator when a "0" is pressed. |
| OBJ/COS 511 | Ports level<br>Ports level Object.<br>This is a fail safe Object where callers are sent when there is no identifying number coming from the PBX portion of the Node or Hub. This Object also comes into play when the Call Processor portion of the Node or Hub doesn't know what else to do with the caller due to a software or ring cadence error. This Object contains the greetings that are played during different times of day and the operator's mailboxes that are used when a caller presses "0". |

Figure 10:
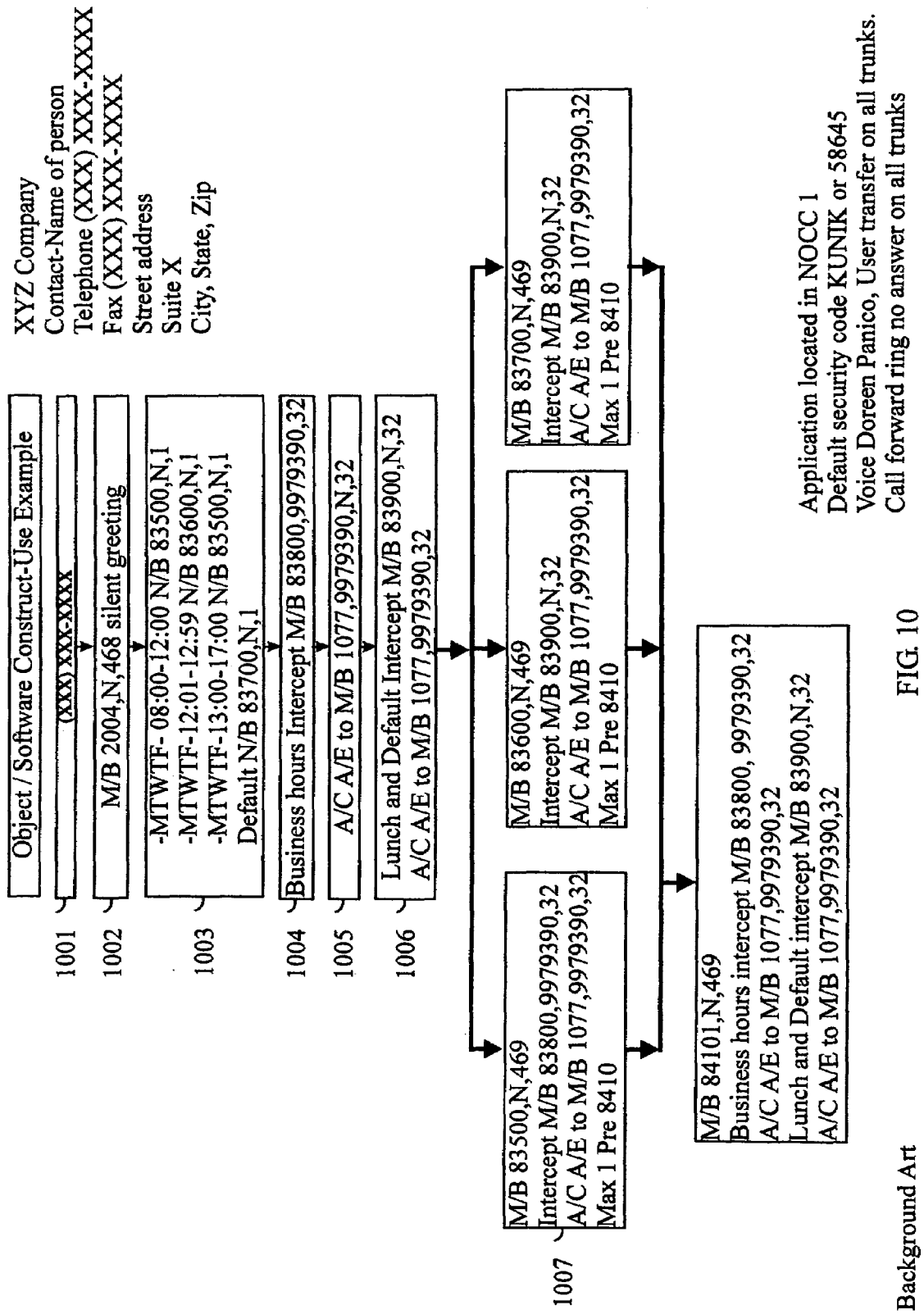
FIG. 10 is an exemplary record showing a customer's configuration of OBJECTS in one embodiment of the present invention.

FIG. 10 shows an example of the records kept of an actual customer's configuration of the OBJECTS used to implement their particular virtual environment. Included are the names, addresses and telephone numbers changed to insure the customer's privacy. Actual verbiage spoken to the caller with a three-letter name in place of the actual customer's name is also part of this example. Each client has a drawing of their configuration designed to be easily read by personnel responsible for the creation, manipulation and destruction of virtual environments. Standardized documentation of the configuration of the OBJECTS allows the drawings to be created rapidly and accurately by copying documentation of pre-configured OBJECTS from a master template drawing.

As shown in FIG. 10, the documentation includes the telephone number 1001 that receives callers who are forwarded or transferred from a customer location or who dial in directly. The entry "M/B 2004,N,468" 1002 depicts a mailbox (M/B) whose first four numbers match the last four digits of the telephone number that receives callers. '2004' is the mailbox number. 'N' means there is no telephone number or extension number associated with this mailbox as a number to be dialed when the caller reaches M/B 2004. '468' is the OBJECT number. M/B 2004 has been placed in OBJECT 468. OBJECT 468 is dedicated to a one-of-a-kind, customer specific application. OBJECT 468 provides time of day control so callers hear different appropriate recordings at different times of day.

The next set of entries in the documentation 1003, the first being '—MTWTF—08:00-12:00 N/B 83500,N,1' explain the different actions that will be taken based on time of day. For example, the first entry indicates that on Monday through Friday, from 8:00 A.M. until 12:00 P.M., a moment of silence is played to the caller. The caller then hears the business hours greeting stored in mailbox 83500,N,1. As explained above, this notation indicates that mailbox 83500 is in OBJECT 1. Upon hearing any part of the greeting recorded in mailbox 83500, the caller may enter an extension number. This extension number is, in reality, a mailbox number. The caller may also select a choice that may be offered in the recording played to the caller such as 0 or 1-9. If the caller does nothing, the greeting will repeat and after several seconds of silence, the caller will hear "Goodbye" and be dropped. The caller will not be permitted to leave a message.

By referencing the table above, the definition of OBJECT 1, used in this example, can be determined. As described in that table, OBJECT 1 provides company greetings, has no associated extension or telephone number, and no messages may be recorded. OBJECT 1 will play the greeting twice, then disconnect the caller. OBJECT 1 is not an area code specific OBJECT. The description of OBJECT 1, which may be used by the personnel configuring the system to determine if it provides the desired functionality, is "The caller hears a recorded message and may enter an extension number or select a menu choice. No numbers are dialed automatically upon a caller reaching this mailbox. If the caller takes no action, the greeting is played twice and the caller is dropped."

When a mailbox such as (M/B) 83800,9979390,32 (see 1004 in FIG. 10) is reached by a caller selecting choice "0" which is the business hours intercept (the operator), the OBJECT obtains the appropriate external dial tone and dials the telephone number XXX-XXXX. Once the telephone number is dialed, CALL PULL-BACK is employed.

The next entry in the documentation, 'A/C A/E to M/B 1077,9979390,32" 1005 means that if a caller leaves a message in M/B 83800, it will be "auto copied" to M/B 1077 and "auto erased" from M/B 83800. M/B 1077 will obtain the appropriate external dial tone from its OBJECT and, depending on how the customer wants the messaging waiting notification times set up in that M/B, message waiting notification will be performed to the telephone number 997-9390. At different times of day different company main greetings are played to the caller.

The entry 'Lunch and Default Intercept M/B 83900,N,32' 6 provides the configuration of the behavior for all times of day and days of week not explicitly configured above, and is typically used for after hours. The entry 'Max 1 Pre 8410' 1007 means that if the caller presses choice "1", they will be taken to M/B 84101 and governed by OBJECT 469.

The recordings spoken to the callers by a mailbox (M/B) number this example are configured as follows:

XYZ Company Greetings

M/B 83500

Business Hours Monday-Friday 8:00 A.M. to 12:00 P.M., and 1:00 P.M. to 5:00 P.M.

Greeting: Thank you for calling XYZ Company. All available phone lines are busy or our operator is assisting a previous caller. If you know your party's extension, please enter it now or press "0" for the operator. For our corporate directory, press "1".

M/B 83500, 83600 & 83700

Holiday Greeting: Put in as a message and prior to the holiday, do a greeting/message swap.

Greeting: Thank you for calling XYZ Company. Our offices are closed for the holiday. If you would like to leave a message, we will be checking in; however, the operator will not be available to assist you. For the corporate directory, press "1". Have a great holiday.

M/B 83600

Lunch Time Monday-Friday 12:01 P.M. to 12:59 P.M.

Greeting: Thank you for calling XYZ Company. We are closed for lunch and will return at 1:00 P.M. If you know the extension of the person for whom you wish to leave a message, please enter it now. For our corporate directory, press "1". To leave a message for our operator, press "0".

M/B 83700

After hours

Greeting: Thank you for calling XYZ Company. Our office hours are Monday through Friday from 8:00 A.M. to 5:00 P.M If you know the extension of the person for whom you wish to leave a message, please enter it now. For our corporate directory, press "1". To leave a message for our operator, press "0".

MB 83800

Name The receptionist

M/B 83900

Name The receptionist

Greeting: Please leave a message at the sound of the tone and we will return your call as soon as possible.

M/B 84101

Greeting: The following is a list of our corporate personnel. At any time you may enter their extension number to leave a message.

| First Name | Last Name | Extension 1060 |
| First Name | Last Name | Extension 1061 |
| First Name | Last Name | Extension 1062 |
| First Name | Last Name | Extension 1063 |
| First Name | Last Name | Extension 1064 |
| First Name | Last Name | Extension 1065 |
| First Name | Last Name | Extension 1066 |
| First Name | Last Name | Extension 1067 |
| First Name | Last Name | Extension 1068 |
| First Name | Last Name | Extension 1069 |
| First Name | Last Name | Extension 1070 |
| First Name | Last Name | Extension 1071 |
| First Name | Last Name | Extension 1072 |
| First Name | Last Name | Extension 1073 |
| First Name | Last Name | Extension 1074 |
| First Name | Last Name | Extension 1075 |
| First Name | Last Name | Extension 1076 |
| First Name | Last Name | Extension 1077 |

M/B 1077

Name The receptionist

Greeting: You have reached (First Name, Last Name), the Receptionist. If you are calling concerning an office matter or to schedule an appointment, please leave your name and telephone number at the tone and I will get back to you.

M/B 1060

Greeting: You have reached the voice mail of (First Name, Last Name). If you are calling concerning an office matter or to schedule an appointment, please call the receptionist at extension 1077 by pressing "1" now. If this is urgent, you may leave a one-minute voice message that will page (First Name). Please leave your message after the tone.

All M/B's in the following list;

| First Name | Last Name | M/B 1069 |
| First Name | Last Name | M/B 1061 |
| First Name | Last Name | M/B 1062 |
| First Name | Last Name | M/B 1063 |
| First Name | Last Name | M/B 1064 |
| First Name | Last Name | M/B 1065 |
| First Name | Last Name | M/B 1067 |
| First Name | Last Name | M/B 1068 |
| First Name | Last Name | M/B 1070 |
| First Name | Last Name | M/B 1071 |
| First Name | Last Name | M/B 1073 |
| First Name | Last Name | M/B 1074 |
| First Name | Last Name | M/B 1075 |
| First Name | Last Name | M/B 1076 |

Greeting: You have reached the voice mail of (First Name, Last Name). Please leave a detailed message at the sound of the tone and your call will be returned as soon as possible.

All M/Bs in the following list;

| First Name | Last Name | M/B 1066 |
| First Name | Last Name | M/B 1072 |

Greeting: You have reached the voice mail of (First Name, Last Name). Please leave a detailed message at the sound of the tone and your call will be returned as soon as possible. For further options, press star* after your message. If you mark your message urgent, (First Name, Last Name) will be paged.

The processes set forth in the present description may be implemented using a conventional general purpose microprocessor programmed according to the teachings of the present specification, as will be appreciated to those skilled in the relevant art(s). Appropriate software coding can readily be prepared by skilled programmers based on the teachings of the present disclosure, as will be apparent to those skilled in the relevant art(s).

The present invention thus also includes a computer-based product that may be hosted on a storage medium and may include instructions which can be used to program a computer to perform a process in accordance with the present invention. The storage medium can include, but is not limited to, any type of disk including floppy disk, optical disk, CD-ROMS, and magneto-optical disks, ROMS, RAMs, EPROM's, flash memory, magnetic or optical cards, or any type of media suitable for storing electronic instructions.

Numerous modifications and variations of the present invention are possible in light of the above teachings and should be construed as part of the present invention.

The invention claimed is:

1. A method of managing communications utilizing all forward and or no answer forwarding effecting traffic at a client's premise to direct traffic to a virtual network call processing system in order to perform primary or secondary answering, at least one called party virtual network call processing system managing communications between at least one calling party and at least one called party in the absence of a called party no answer condition and at least one virtual network call processing system managing communications between the at least one calling party and the at least one virtual network call processing system application during a called party no answer condition comprising the steps of:

a) configuring at least one virtual voice network call processing system application to manage communications between the at least one calling party and the at least one virtual network call processing system application during a called party no answer condition, the at least one virtual network call processing system application comprising at least one software application comprising at least one object, the at least one object comprising at least one first object, the at least one virtual network call processing system application having at least one numerical address, the configuring comprising associating the at least one numerical address of the at least one virtual network call processing system with the at least one first object, the at least one first object routing communications between the at least one calling party and the at least one virtual network call processing system application during the called party no answer condition;

b) issuing at least one forwarding configuration instruction to at least one telecommunications carrier instructing the at least one telecommunications carrier to utilize all forward and or no answer forwarding effecting traffic at a client's premise to route communications between the at least one calling party and the at least one called party virtual network call processing system application;

c) managing communications between the at least one calling party and the at least one called party in the absence of a called party no answer condition and between the at least one calling party and the at least one virtual network call processing system application during a called party no answer condition; the configuring of step a) further comprises:

associating at least one numerical address of the at least one virtual network call processing system with the at least one second object, the at least one second object managing interactive communications between the at least one calling party and the at least one virtual network call processing system application during a called party no answer condition, the at least one second object having at least one menu of at least one choice to be selected by the at least one calling party;

the managing of step c) further comprises:

communicating the at least one menu of at least one choice to the at least one calling party at least during the called party no answer condition;

receiving the at least one selection from the at least one calling party upon selection by the at least one calling party;

the at least one virtual network call processing system application managing communications between the at least one calling party and the at least one virtual network call processing system application at least during the called party no answer condition, in accordance with at least one selection received from the at least one calling party.

2. The method of claim 1, wherein:
the called party no answer condition comprises no response from the at least one called party.

3. The method of claim 1, wherein:
the at least one choice comprises at least one option for routing communications from the at least one calling party to at least one called party.

4. The method of claim 1, wherein:
the at least one virtual network call processing system comprises at least one client.

5. The method of claim 1, wherein:
the at least one virtual network call processing system comprises at least one virtual network call processing system application.

6. The method of claim 1, wherein:
the at least one object comprises at least one third object that manages call flow.

7. The method of claim 1, wherein:
the at least one telecommunications carrier determines whether the all forward and or no answering forwarding effecting traffic at a client's premise exists.

8. The method of claim 1, wherein:
the at least one virtual network call processing system application determines whether the called party no answer condition exists.

9. The method of claim 1, wherein:
the at least one telecommunications carrier determines at least one communications status condition.

10. The method of claim 1, wherein:
the at least one virtual network call processing system application determines at least one communications status condition.

11. The method of claim 1, wherein:
the at least one virtual network call processing system application determines at least one communications status condition and communicates the at least one menu of the at least one choice to the at least one calling party at least during the called party no answer condition.

12. The method of claim 1, wherein:
the at least one object comprises at least one fourth object that manages call flow.

13. The method of claim 1, wherein:
the at least one object comprises at least one fifth object that manages termination of call flow.

14. The method of claim 1, wherein:
the at least one object is associated with at least one mailbox.

15. The method of claim 1, wherein:
the at least one mailbox comprises at least one greeting.

16. The method of claim 15, wherein:
the at least one object comprises at least one fax on demand application.

17. The method of claim 1, wherein:
the at least one object manages at least one call.

18. The method of claim 1, wherein:
the at least one object manages call redirection based upon evaluation of the at least one selection received from the at least one calling party.

19. The method of claim 1, wherein:
the at least one object manages call redirection, in accordance with the at least one selection received from the at least one calling party.

20. The method of claim 1, wherein:
the at least one object manages recording and storage of email, voice and fax messages.

21. The method of claim 1, wherein:
the at least one object manages erasing of recorded and stored e-mail, voice and fax messages.

22. The method of claim 1, wherein:
the at least one object manages at least one form application.

23. The method of claim 1, wherein:
the at least one object activates at least one pager.

24. The method of claim 1, wherein:
the at least one object manages at least one dynamic call blocking service.

25. The method of claim 1, wherein:
the at least one object manages at least one multimedia message.

26. The method of claim 1, wherein:
the at least one object manages at least one call transfer.

27. The method of claim 1, wherein:
the at least one object manages system administration.

28. A method of managing communications utilizing all forward and or no answer forwarding effecting traffic at a client's premise to direct traffic to a virtual network call processing system in order to perform primary or secondary answering, at least one called party virtual network call processing system managing communications between at least one calling party and at least one called party in the absence of a called party no answer condition and at least one virtual network call processing system managing communications between the at least one calling party and the at least one virtual network call processing system application during a called party no answer condition comprising the steps of:
  a) configuring at least one virtual network call processing system application to manage communications between the at least one calling party and the at least one virtual network call processing system application during a called party no answer condition, the at least one virtual network call processing system application comprising at least one software application comprising at least one software construct, the at least one software construct comprising at least one first software construct, the at least one virtual network call processing system application having at least one numerical address, the configuring comprising associating the at least one numerical address of the at least one virtual network call processing system application with the at least one first software construct, the at least one first software construct routing communications between the at least one calling party and the at least one virtual voice network call processing system application during the called party no answer condition;
  b) issuing at least one forwarding configuration instruction to at least one telecommunications carrier instructing the at least one telecommunications carrier to utilize all forward and or no answer forwarding effecting traffic at a client's premise to route communications between the at least one calling party and the at least one called party virtual network call processing system application;
  c) managing communications between the at least one calling party and the at least one called party in the absence of a called party no answer condition and between the at least one calling party and the at least one virtual network call processing system application during a called party no answer condition the configuring of step a) further comprises:
  associating at least one numerical address of the at least one virtual network call processing system with the at least one second software construct, the at least one second software construct managing interactive communications between the at least one calling party and the at least one virtual network call processing system application during a called party no answer condition, the at least one second software construct having at least one menu of at least one choice to be selected by the at least one calling party;
  the managing of step c) further comprises:
  communicating the at least one menu of at least one choice to the at least one calling party at least during the called party no answer condition;
  receiving the at least one selection from the at least one calling party upon selection by the at least one calling party;
  the at least one virtual network call processing system application managing communications between the at least one calling party and the at least one virtual network call processing system application at least during the called party no answer condition, in accordance with at least one selection received from the at least one calling party.

29. The method of claim 28, wherein: the called party no answer condition comprises no response from the at least one called party.

30. The method of claim 29, wherein:
the at least one software construct compromises at least one object.

31. The method of claim 29, wherein:
the at least one software construct comprises at least one object.

32. The method of claim 30, wherein:
the at least one third object that manages call flow.

33. The method of claim 32, wherein:
the at least one software construct comprises at least one fourth object that manages call flow.

34. The method of claim 29, wherein:
the at least one software construct comprises at least one fourth object that manages termination of call flow.

35. The method of claim 29, wherein:
the at least one object comprises at least one fifth software construct that manages termination of call flow.

36. The method of claim 29, wherein:
the at least one software construct is associated with at least one mailbox.

37. The method of claim 29, wherein:
the at least one software construct comprises at least one fax on demand application.

38. The method of claim 28, wherein:
the at least one software construct manages at least one call.

39. The method of claim 28, wherein:
the at least one software construct manages call redirection, based upon evaluation of the at least one selection received from the at least one calling party.

40. The method of claim 28, wherein:
the at least one software construct manages call redirection, based upon evaluation of the at least one selection received from the at least one calling party.

41. The method of claim 28, wherein:
the at least one software construct manages call redirection, in accordance with the at least one selection received from the at least one calling party.

42. The method of claim 28, wherein:
the at least one software construct manages recording and storage of e-mail, voice and fax messages.

43. The method of claim 28, wherein:
the at least one software construct manages erasing of recorded and stored e-mail, voice and fax messages.

44. The method of claim 28, wherein:
the at least one software construct manages at least one form application.

45. The method of claim 28, wherein:
the at least one software construct activates at least one pager.

46. The method of claim 28, wherein:
the at least one software construct manages at least one dynamic call blocking service.

47. The method of claim 28, wherein:
the at least one software construct manages at least one multimedia message.

48. The method of claim 28, wherein:
the at least one software construct manages at least one call transfer.

49. The method of claim 28, wherein:
the at least one software construct manages system administration.

* * * * *